United States Patent [19]
Wedin

[11] Patent Number: 5,106,253
[45] Date of Patent: Apr. 21, 1992

[54] AXIALLY MOUNTED BALE CARRIERS

[76] Inventor: Donald S. Wedin, R.R. 2, Box 91, Camp Douglas, Wis. 54618

[21] Appl. No.: 650,901

[22] Filed: Feb. 5, 1991

[51] Int. Cl.⁵ ............................................. A01D 85/00
[52] U.S. Cl. ..................................... 414/24.5; 414/920
[58] Field of Search .................... 414/24.5, 685, 686, 414/920

[56] References Cited

U.S. PATENT DOCUMENTS

| | | | |
|---|---|---|---|
| 2,725,995 | 12/1955 | Silbaugh | 414/686 |
| 4,099,629 | 7/1978 | Cox | 414/24.5 |
| 4,256,426 | 3/1981 | Buss | 414/24.5 |
| 4,306,825 | 12/1981 | Yilit | 414/24.5 |
| 4,318,653 | 3/1982 | Benefield et al. | 414/24.5 |
| 4,790,558 | 12/1988 | Ellis | 414/920 X |

FOREIGN PATENT DOCUMENTS

| | | | |
|---|---|---|---|
| 2511125 | 9/1976 | Fed. Rep. of Germany | 414/24.5 |
| 1548029 | 7/1979 | United Kingdom | 414/24.5 |
| 2153337 | 8/1985 | United Kingdom | 414/24.5 |
| 2158804 | 11/1985 | United Kingdom | 414/920 |

*Primary Examiner*—Frank E. Werner
*Assistant Examiner*—Craig Slavin
*Attorney, Agent, or Firm*—M. Paul Hendrickson

[57] ABSTRACT

There is disclosed a bale carrying attachment suitably adapted for use upon transporting tractors equipped with a hydraulic driven power source. The attachment includes a pivotally mounted spear, and a supportive carriage member which slideably reciprocates along the spear. The elevational pitch of the spear is controlled by the reciprocating movement of the carriage member. The carriage member includes mounting sites for axially mounting stabilizing braces and the hydraulic source onto the carriage member for stabilizing it against lateral movement while also permitting it to supportively reciprocate along the spear.

15 Claims, 6 Drawing Sheets

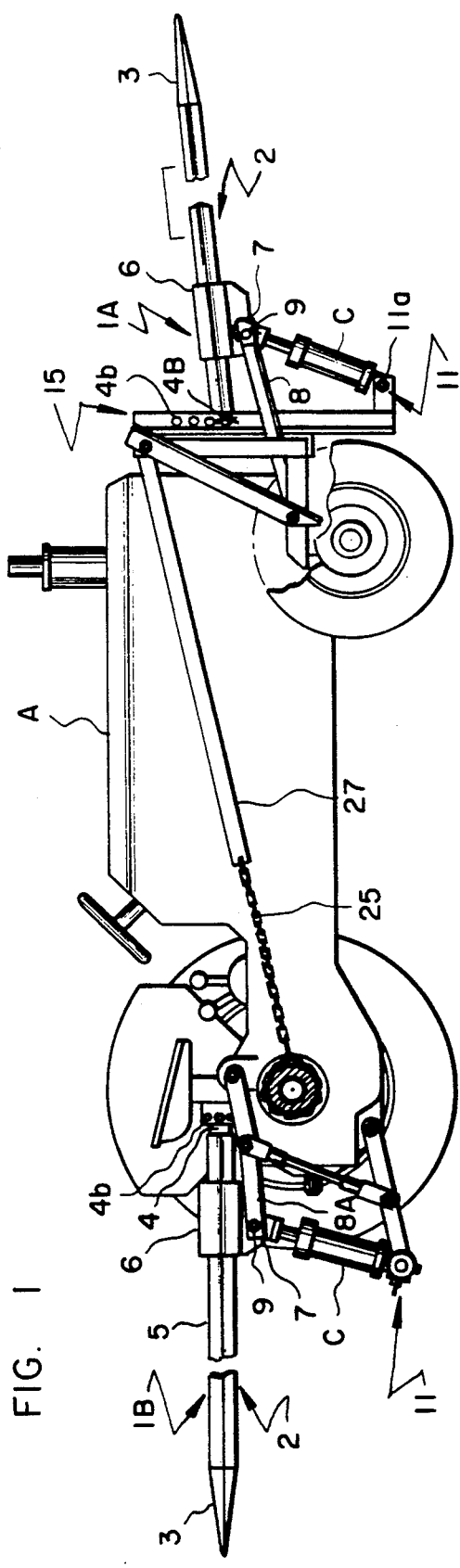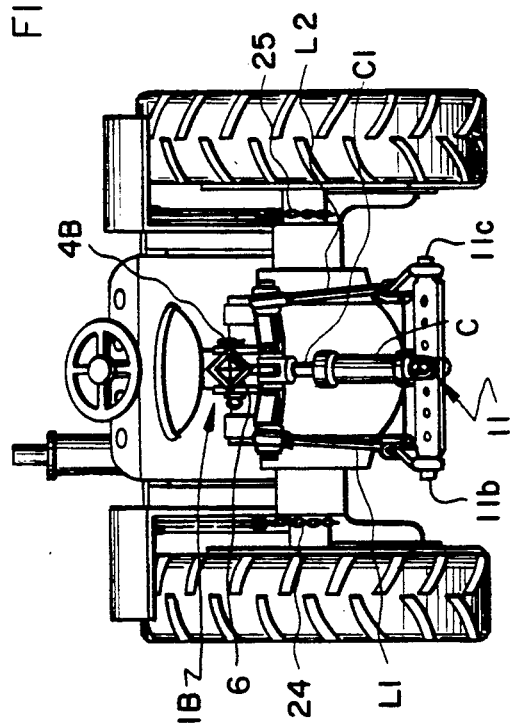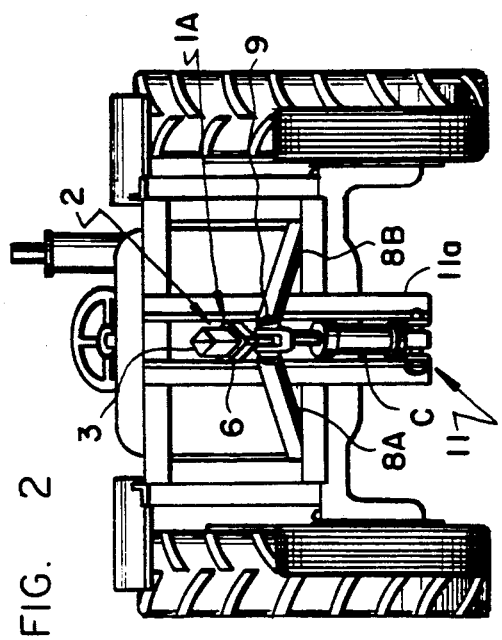

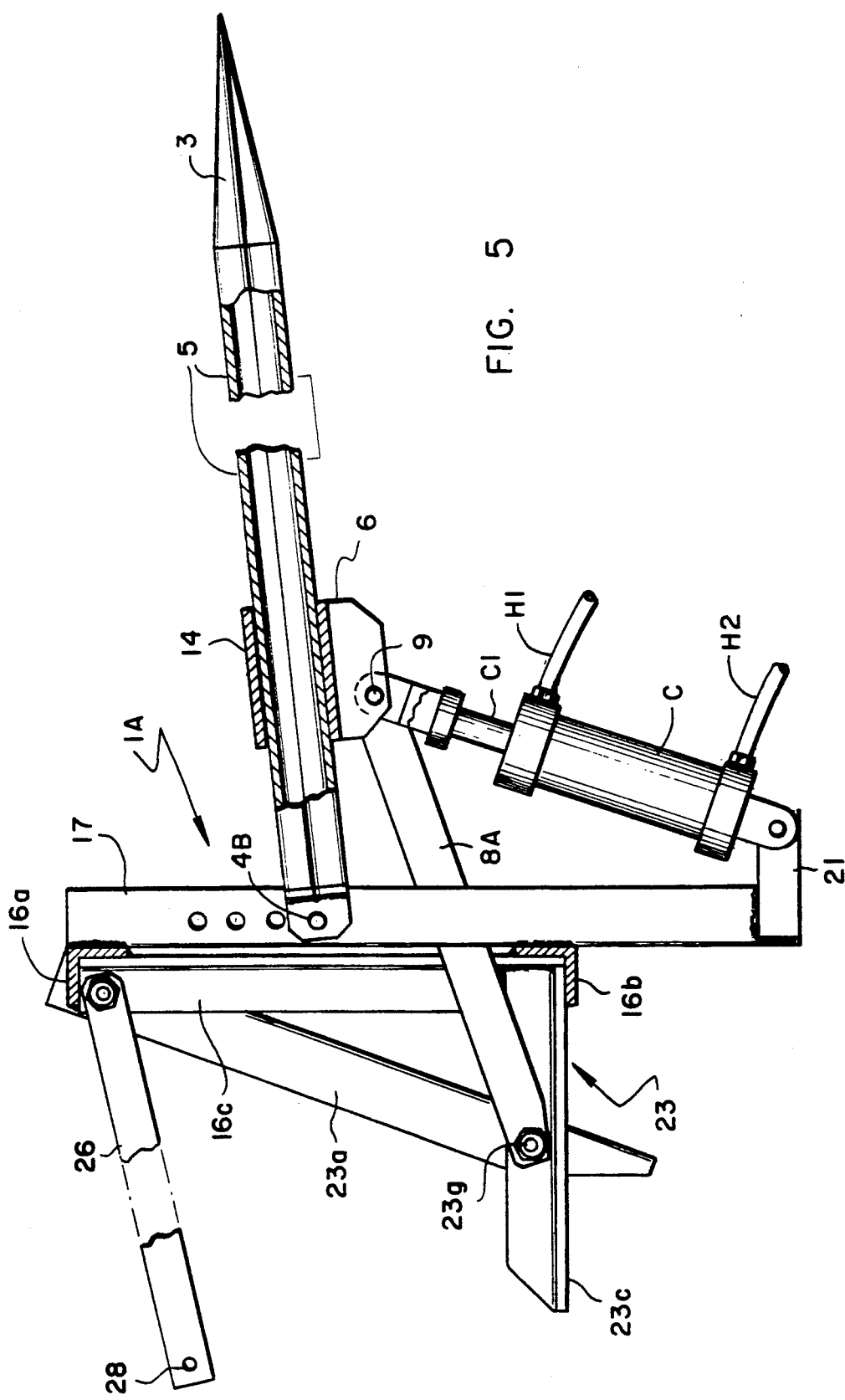

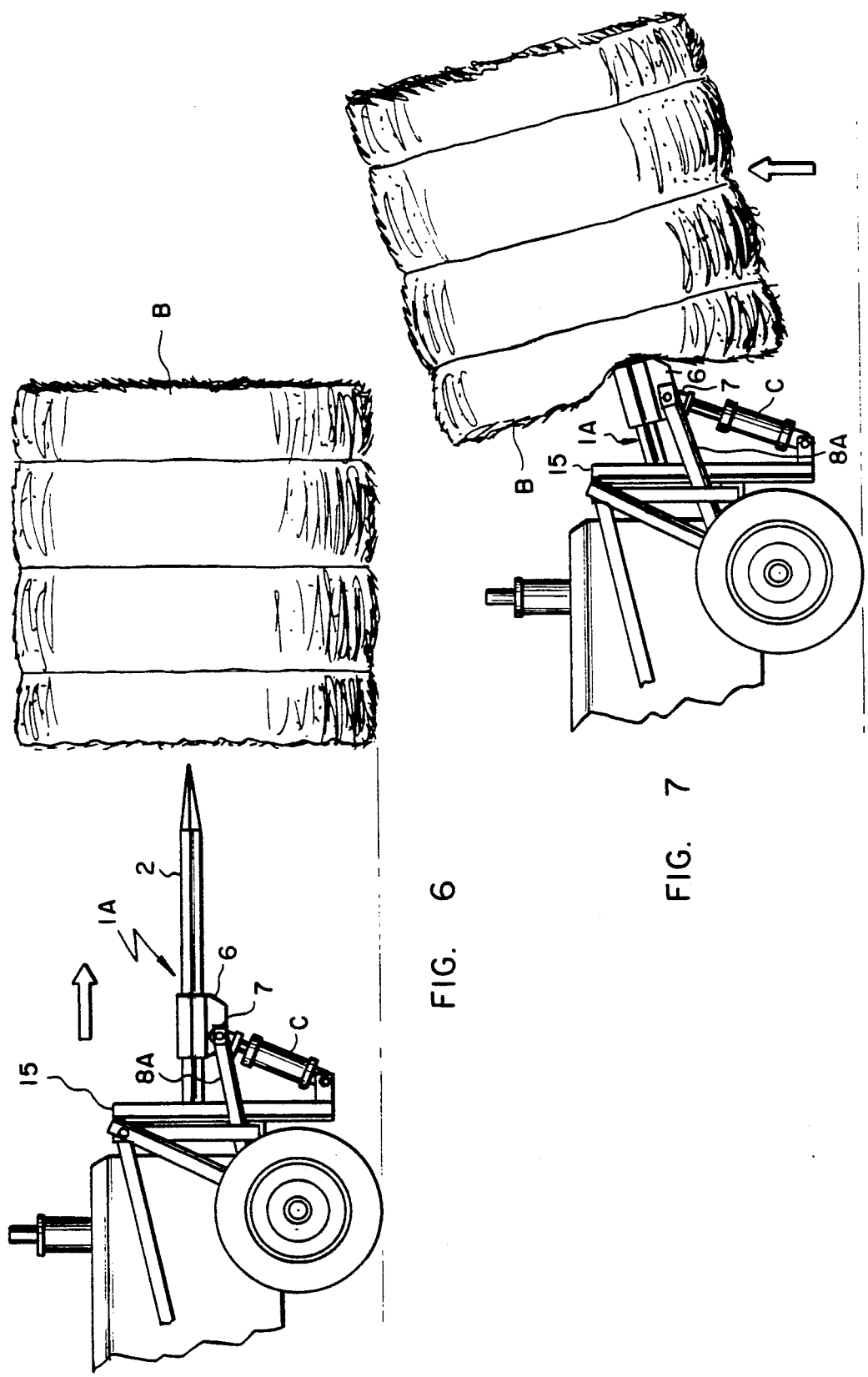

AXIALLY MOUNTED BALE CARRIERS

FIELD OF THE INVENTION

The present invention pertains to transporting devices and attachments, and more particularly to a bale moving attachment for use in combination with transporting vehicles.

BACKGROUND OF THE INVENTION

Within the farming industry, the production of forage in the form of large bales (e.g. 400 pounds to a ton or more) has become increasingly popular. The major advantage of the large bale is that it enables the farm producer to more expeditiously and easily bale forage products while substantially reducing labor requirements and potential spoilage due to inclement weather conditions. Unfortunately many farm tractors (especially the smaller and older farm tractors) are currently unfit to serve as bale carriers. This arises because conventional bale moving attachments are generally not universally adaptable to the various types and models of farm tractors. The over-all design, functional efficacy, stability, attachment costs and time of attaching it to a tractor also leave much to be desired in the traditional bale carrying attachments.

Conventional bale moving devices typically embody a number of mechanical limitations or drawbacks which generally restrict their utility to rather specific and limited adaptations. For example, the transport of large bales is often hazardous and especially when the transporting conditions approach or exceed the stability limitations of the transporting tractor. The bulk and weight of the lifted bale substantially alters and shifts the gravitational center. This problem becomes particularly acute when the bale transport is conducted upon uneven or steep terrain with an undersized tractor. An abrupt or casual shift in the bale weight may create a hazardous condition which may lead to tipping or upending of the transporting tractor. Such problems substantially increase the hazardous perils of bale transporting and especially when older modeled tractors are used as a transporting carrier.

Traditional bale moving attachments are typically limited in adaptation to a particular farm tractor type or model. The bale moving attachments are thus generally made so as to custom fit onto a specific tractor model. The attachments are also primarily targeted towards the newer or heavier modeled tractors typically equipped with powerful rear mount three-point hitch systems for directly mounting bale carrying attachments thereto. Front end bale carrying attachments are likewise generally targeted towards the larger tractor types and models equipped with front end loaders. This typically requires a farm producer to either remove a more powerful and costly tractor from other productive work, hire a jobber to move the bales or purchase another large farm tractor to serve as a bale carrier.

Crop production is highly labor intensive during harvest time. Farm producers must have the capability to timely and expeditiously harvest the crops. Weather conditions may abruptly change and spoil an unbaled crop. During harvests, a few harvesting hours can often spell the difference between a successful harvest or a spoiled crop. Inflationary costs and decreased profitability also necessitate that the farm producer curtail farm labor and equipment costs without compromising the producer's harvesting capacity. Attachments readily attachable to the farm equipment while also minimizing the capital expenses (e.g. tractor, equipment costs, etc.) could contribute towards a more efficient and profitable farm operation. A bale carrier attachment of adaptation to different types of farm tractors while also requiring a minimum amount of time and effort for its attachment would thus enhance efficiency and profitability. Further benefits to the farm producer would be realized if there were available a low cost bale moving attachment which could be effectively combined with an inexpensive and readily available power drive source (e.g. such as a farm hydraulic cylinder) to provide an inexpensive and effective primary or complementary power supply source for converting the older tractor models or types into a highly effective bale carrier. Additional advantages would also be realized if the bale carrying attachment could be universally utilized so as to convert conventional farm tractors into both a front and rear bale carrier.

SUMMARY OF THE INVENTION

The present invention provides a bale moving attachment which can readily convert a conventional farm tractor into a bale carrier. The inventor, realizing the defects and limitations of the prior art bale carrying attachments, created an attachment which effectively overcomes the aforementioned defects and limitations.

The attachment includes an elongated rod or barrel terminated by a bale impaling tine or spear at the end of the rod and a rod connector at an opposite rod end. The rod connector is used to connect the rod to an axial mounting site that allows the rod to radially pivot about its mounting site.

The rod is supported and slideably engages onto a carriage equipped for linkage onto a power drive source for vertically adjusting the carriage and the slideably supported rod to the appropriate elevational level or pitch. The carriage includes a one or more pivotal or axial mounting connectors which serves to mount lateral stabilizing braces and a power drive unit to the carriage.

In the preferred embodiments of its use, the attachment relies upon a conventional hydraulic cylinder as the drive means for powering the carriage to the desired elevational level. The carriage in its preferred embodiments includes a hydraulic cylinder connector for connecting the hydraulic cylinder to the carriage thus allowing for elevationally raising and lowering the carriage and the supported rod thereby. The attachment also in its preferred embodiments includes a pair of lateral braces which laterally extend outwardly in opposing directions from the carriage to a fixed and stabilizing connecting site so as to brace the carriage against lateral movement. The lateral braces are also preferably pivotally mounted to the carriage member (such as by a shaft) which permits the braces to radially pivot thereabout. The lateral braces are also pivotally anchored to a fixed anchoring site such as upon the tractor itself or a supportive frame anchored onto the tractor in such a manner so as to permit radial movement of the lateral braces about the anchoring site. The pivotal mounting of the lateral braces at both brace ends allows the braces to radially and concurrently move about their respective fixed axial connective sites as the carriage member is raised or lowered by the hydraulic cylinder. The braces may be anchored onto the tractor or by a separate frame affixed to the tractor so as to provide a fixed brace anchoring site about which the braces in cooperative association with the carriage member radially pivot. The braces, as previously mentioned, are also pivotally associated and connected to the carriage member so that the braces will radially move in a cooperative and reciprocal association with the hydraulic cylinder movement. The stabilizing braces reciprocate about a curved radius fulcrummed about the carriage member as the hydraulic cylinder is raised or lowered to the appropriate elevational position.

When the attachment is used in combination with a hydraulic cylinder, such as those commonly fitted with terminal axial connective mounts at each cylinder end, one of the axial mounts is secured to the tractor or a supportive frame affixed to the tractor while other axial mount is connected to the carriage. In operation, the attachment thus includes a carriage member which slideably engages the rod and elevationally supports the rod at a desired elevated level. The pivotal movement of the lateral braces respectively at a proximate end to the tractor or support frame thereof and the pivotal anchoring at a distal end of the braces to the carriage member plus hydraulic cylinder pivotally mounting contribute towards a cooperative combination which retain the rod in a straight-forward projecting and stabilized relationship against lateral movement. The lateral braces pivotally mounted at their respective terminating ends, the hydraulic cylinder pivotal mount and the supportive and slideable engagement of the spear thereto form a common arcuate relationship between components moving about the carriage as the rod is elevationally adjusted by the ram of the hydraulic cylinder.

BRIEF DESCRIPTION OF THE FIGURES

FIG. 1 depicts a cut-away side view of a tractor equipped with both a front and rear mounted bale carrying attachment of this invention.

FIG. 2 is a front view of the front mounted attachment shown in FIG. 1.

FIG. 3 is a rear view of the rear mounted attachment shown in FIG. 1.

FIG. 5 is a cross-sectional view of the front mounted attachment taken along line 5—5 of FIG. 4.

FIG. 6 depicts a partial side view of the attachment mounted onto the front end of a tractor with the attachment being positioned for impaling a large hay bale therewith.

FIG. 7 depicts the attachment shown in FIG. 6 showing the large bale impaled therewith and bale lifted to a transporting position.

DETAILED DESCRIPTION OF THE INVENTION AND ITS PREFERRED EMBODIMENTS

Figure 4:
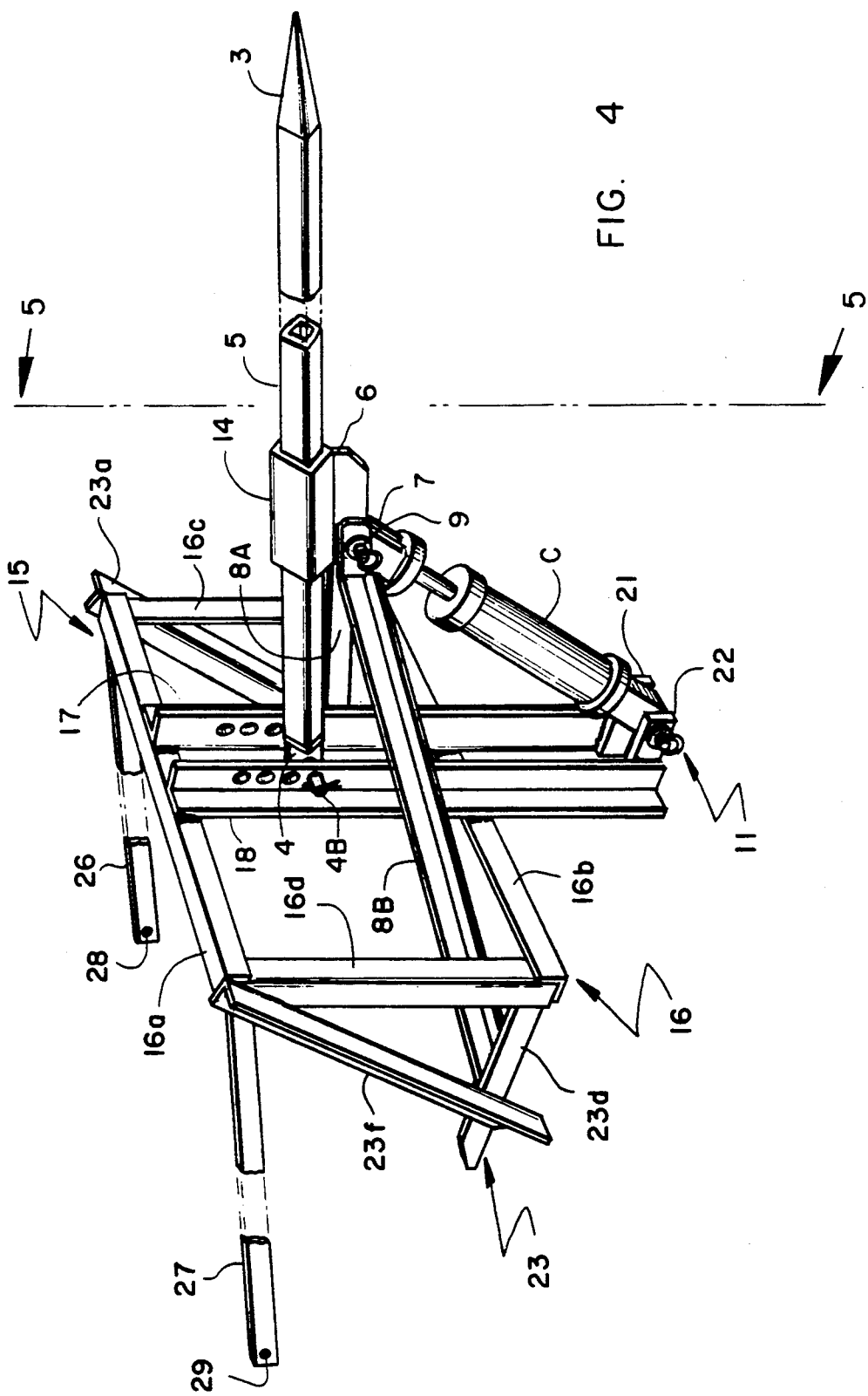
FIG. 4 is a perspective view of the front mounted attachment shown in FIG. 1.

With reference to the Figures, the present invention provides for a bale moving attachment (generally prefixed as 1) which may be adapted for use in a tractor (designated as A) as either a rear mounted bale moving attachment 1A (e.g. see FIGS. 3 and 9) or a front mounted bale attachment 1B (e.g. see FIGS. 2–6 and 8) or adapted for attachment onto a tractor as both a front 1A and 1B rear mounted attachment as shown in FIG. 1. The combined use of both the front 1A and rear 1B mounted attachment not only doubles the bale transporting capacity of the tractor A but also helps to stabilize the transporting tractor A against tipping or upending. This dual capacity bale transport is especially important when the attachment 1 is used with a smaller transporting tractor A.

According to the present invention there is provided a bale transporting attachment 1 for use in combination with a transporting tractor A to transport a bale B therewith, said attachment 1 comprising:

A) a pivotally mountable bale impaling spear (generally designated as 2) which includes a pivotal spear connector 4 at one spear end for mounting the spear to a pivotal mounting site so as to permit the spear 2 to radially move along an arcuate curvature about the pivotal connector 4, a tine 3 for spearing the bale therewith and an elongated spear barrel 5 or rod bridging between said tine 3 and said pivotal connector 4;

B) an adjustable spear carriage (generally designated as 6) which slideably engages and supports the barrel 5 as the spear 2 radially moves about said arcuate curvature;

C) axial mounting means (generally prefixed as 7 and shown in the Figures as a shaft receiving aperture) for operatively connecting the carriage 6 to a reciprocating drive power source C for adjusting the spear 2 about said arcuate curvature; and D) stabilizing means (generally designated as 8) for stabilizing the carriage 6 against lateral movement as the spear 2 is adjusted about said arcuate curvature.

Figure 8:
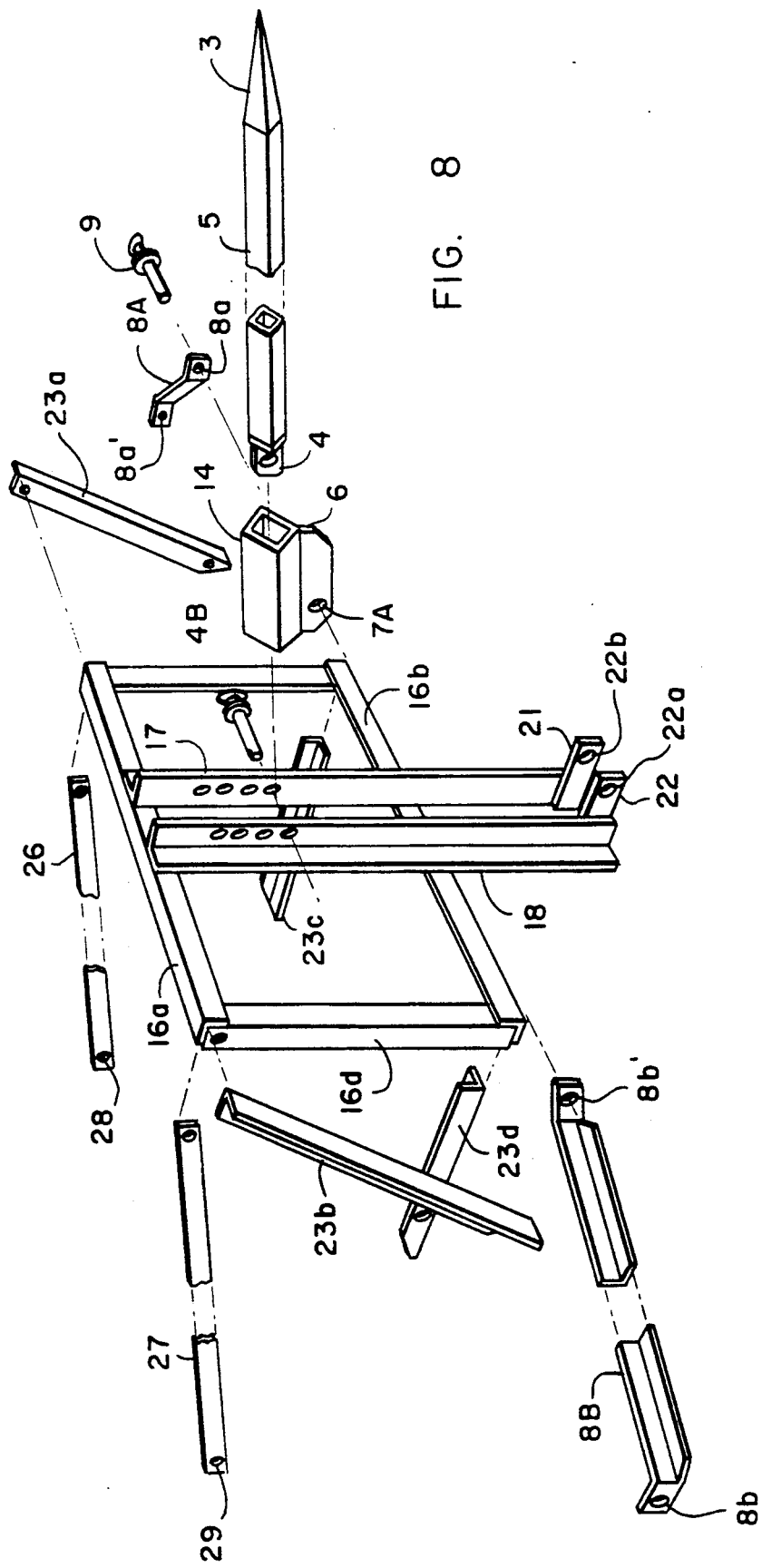
FIG. 8 shows in greater detail an unassembled view of the attachment shown in FIG. 4.

By referring to a preferred embodiment as depicted in FIG. 8, the carriage 6 includes a shaft receiving aperture 7A which serves the dual purpose of connecting the axial means 7 to the drive source C and the stabilizing means 8 to carriage 6. Shaft 9 (shown as a hydraulic cylinder connecting pin) serves to connect aperture 7A and stabilizing means 8 to carriage 6. This permits the drive source C and the stabilizing means to axially pivot about shaft 9 as the carriage is adjusted throughout its arcuate movement. Alternatively the axial means 7 and stabilizing means 8 may, if desired, be each provided with a different carriage connective axial mounts (not shown) positioned upon the carriage 6 for their respective mounting thereto. Alternatively, carriage 6 may include a connective shaft or shafts (not shown) as the axial mounting means for connecting the drive source C and stabilizing braces 8A and 8B thereto.

The power drive source C drives carriage 6, which in turn regulates the pitch of spear 2. Other mechanical drives such as via pulleys, chains, worm gears, rack and pinions, etc. pivotally or axially mounted onto carriage 6 may be alternatively utilized to adjust carriage 6 to an appropriate elevational level or pitch. In operational use, it is advantageous for the drive source C and stabilizing braces 8A and 8B to concurrently move about fixed radial pathways as spear 2 is adjusted along its arcuate curvature. This may be effectuated in the case of the depicted hydraulic cylinder C by axially connecting one end (e.g. the ram end $C_1$ as shown in FIG. 5) of the hydraulic cylinder to shaft 9, carriage 6, and the opposite cylinder connecting mount is connected to an axial anchoring site (generally prefixed by 11) which because of its dual axial mounting allows for concurrent radial movements of hydraulic cylinder C and spear 2 as hydraulic adjustments thereto are made. As may be observed from FIG. 2, axial movement of hydraulic cylinder at the lower hydraulic cylinder connector occurs about connecting pin 11a; whereas, in FIG. 3 the draw bar mounts 11b and 11c serve to permit the axial movement thereabout.

Figure 9:
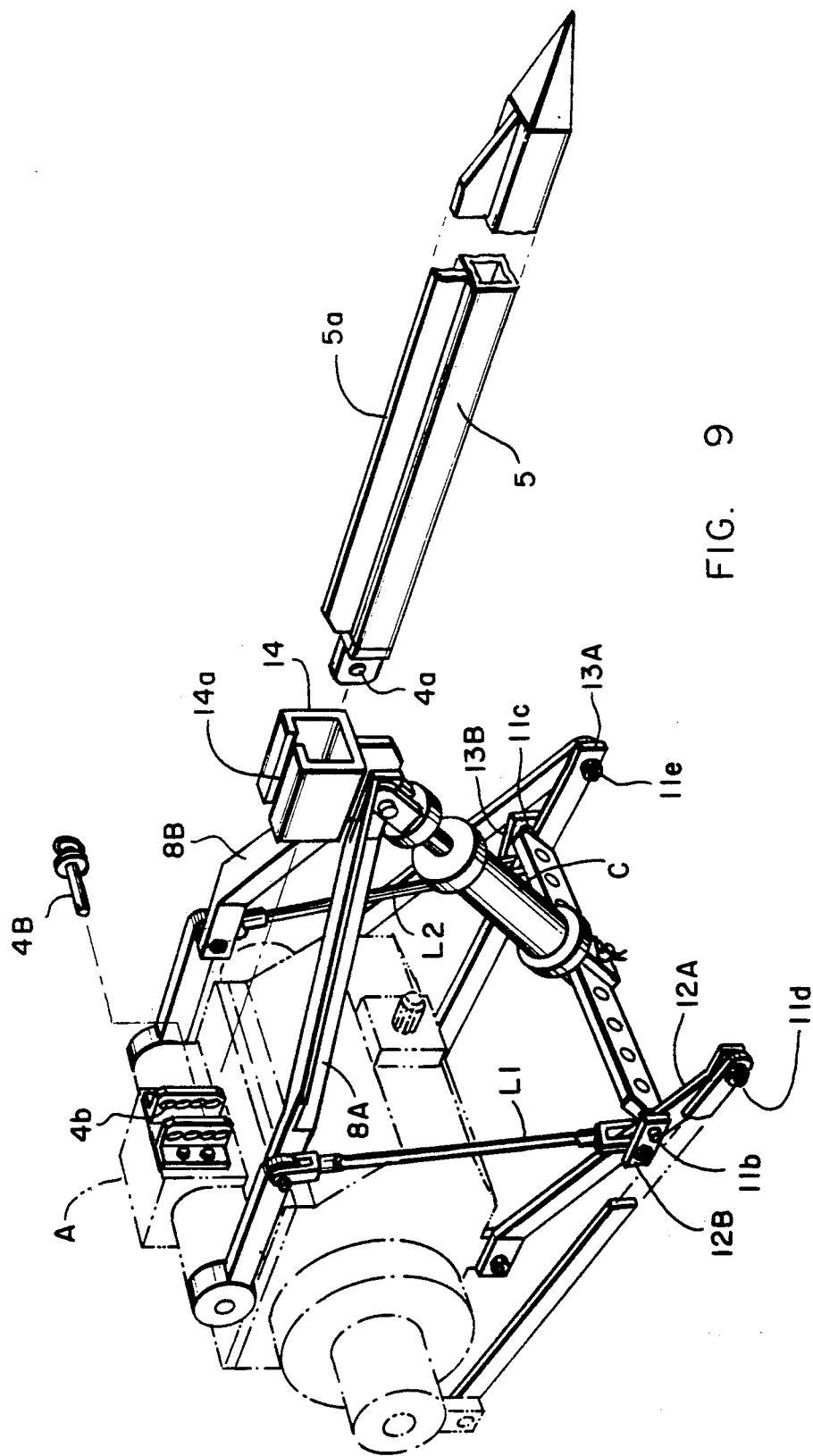
FIG. 9 depicts another embodiment for mounting the attachment onto a transporting tractor.

FIG. 9 depicts a preferred embodiment for the rear attachment 1B mounting onto the draw bar tractor lifting mechanism for purposes of shifting the lifted bale gravitational center towards tractor A. This enhances transporting stability. A pair of axially mounted brackets 12A and 13A are respectively connected at one bracket end to draw bar mounts 11b and 11c with the opposite bracket ends of brackets 12A and 13A being coupled to the draw bar coupling shafts 11d and 11e in combination with brackets 12B and 13B axially connected at one terminating end to shafts 11d and 11e and at another end to lifting arms L1 and L2 serve to shift the gravitational lifting center towards tractor A.

The hydraulic cylinder C is preferably positioned along a vertical bisect of the longitudinal axis of tractor A and spaced sufficiently apart from carriage 6 so as to permit a ram C1, of an appropriate ram length to be extended from or withdrawn from cylinder C and thereby provide the proper elevational adjustment level for spear 2. Tractors of an insufficient lifting capacity to lift and transport large bales when combined with hydraulic cylinder C may be thereby readily converted into a highly effective bale transporting carrier.

The stabilizing means 8 for stabilizing the carriage 6 and the concomitant spear 2 supported thereby may be effectively achieved by a pair of stabilizing braces 8A and 8B respectively fitted at one brace end with a carriage 6 mounting connectors 8a and 8b (as shown more specifically in FIG. 8) for axial coupling onto the carriage 6 and frame mounting connectors $8a^1$ and $8b^1$ for axially coupling onto a laterally positioned anchoring site:

The mirror imaged lateral braces 8A and 8B, when operationally secured to the transporting tractor, extend laterally outwardly and rearwardly (e.g. see FIGS. 2-4) from carriage 6 to their respective axial anchoring mounts which are spaced sufficiently apart and removed from carriage 6 so as to allow for adjustment of carriage 6 to the required variable pitch of spear 2 and at a position sufficient to stabilize carriage 6 and spear 2 against substantial lateral movement away from the vertical plane which vertically bisects the longitudinal axis of tractor A.

The attachment 1 is designed so that spear 2 and carriage 6 when attached to tractor A will be substantially aligned along the bisecting vertical plane of the longitudinal axis of tractor A. As the hydraulic ram C is adjusted throughout its elevational range, carriage 6 generates a radial pathway following the plane of arcuate curvature through which spear 2 radially moves in substantial alignment with the bisecting plane. Cylinder C, braces 8A and 8B are thus designed to concurrently and radially move about their respective axial mounts in cooperative association with the movement of the spear 2. In the present invention, the braces 8A and 8B as well as the hydraulic cylinder C should axially allow for their respective axial movement. The carriage mounting connectors 8a and 8b, and the frame mounting connectors ($8a^1$ and $8b^1$) and are depicted herein as a shaft receiving aperture but may, however, be alternatively modified to protruding shafts (not shown) for corresponding mounting of the carriage 6 and anchoring sites therefore.

When attachment 1 is properly attached to the transporting tractor A, braces 8A and 8B and the drive unit C effectively stabilize the carriage 6 and the slideably engaging spear 2 supported thereby against lateral movement during the spearing and transport of bale B therewith. Braces 8A and 8B are depicted as respectively having frame mounting connectors $8a^1$ and $8b^1$ for axially coupling braces 8A and 8B to an anchoring site disposed at opposite sides of the main axis of spear 2. The axial mounting of connectors $8a^1$ and $8b^1$ onto the transporting tractor A is preferably positioned above the mounting position of hydraulic cylinder C. Braces 8A and 8B when mounted onto tractor A form equilateral triangular legs extending laterally outward from carriage 6. Mounted braces 8A and 8B effectively retain carriage 6 substantially along a fixed vertical plane or radial pathway as the carriage 6 is raised or lowered by hydraulic cylinder C.

In the preferred embodiments of the invention, the carriage 6 includes a barrel guide (generally designated as 14) which helps to guide and retain barrel 5 along the vertical plane of the longitudinal bisect of tractor A. Guide 14 is preferably in the form of an annular guide of a sufficient size and configuration to slideably accommodate barrel 5. A pair of guiding rims (e.g. see FIG. 9), or other appropriate guiding means may also be used for this purpose. Although the carriage 6 is preferably fitted with a guide 14 for guiding the barrel along the carriage 6, guide 14 may be eliminated by simply allowing barrel 5 to slideably interface onto carriage 6. A rod guide 14 in cooperative association with pivotal mounting of spear 2 so as to effectively limit spear 2 to substantially vertical movement about pivotal connector 4 further stabilizes spear 2 against lateral pitching or movement. This cooperative association, when combined with the lateral stabilizing effect of the mounted cylinder C and the lateral brace supports 8A and 8B, optimizes the lateral stability of the bale moving attachment.

The depicted rear mount attachment 1B is also adaptable to tractors equipped with different implement hook-up systems. For example, tractors having a fixed or horizontally adjustable draw bar may be suitably equipped with a draw bar coupling adapter (not shown) which may be secured onto the draw bar and includes an axial coupler for connecting the hydraulic cylinder C thereto.

The transporting tractor A may include an appropriate axial mounting site for axially coupling the spear connector 4 and stabilizing braces $8a^1$ and $8b^1$ thereto. Farm tractors equipped with the three-point hitch system typically include a center link hook-up for attaching three-point implements thereto. The center-link hook-up (e.g. see FIGS. 3 and 9) typically comprises a vertical channel section with a series of mating apertures 4b for axially connecting the spear thereto. Spear connector 4 may be axially mounted to the appropriate mating apertures 4b via connecting pin 4B. The center-link apertures 4b positioning (i.e. beneath the tractor seat and along the longitudinal bisect) coupled with the ability to vertically adjust the spear 2 via pin 4b to the appropriate height to match the tractor size and working conditions affords a particularly suitable mount for pivotally mounting the spear 2 to tractor A. However, if axial mounting sites are not present for connecting spear connector 4 thereto, suitable axial spear mounting connecting adapters may be fitted onto tractor A.

The depicted front mounted attachment 1B differs in several respects from conventional farm tractor bale carrying attachments. Conventional front mounted bale carrying attachments typically rely upon conventional hydraulic powered front end loader accessories to power and mount the bale carrier thereto. The bale carrier will typically unitarily and cooperatively move as a rigidly fixed spearing unit with the front end loader arm movements. In contrast, the bale carrying attachments 1A herein relies upon the axial mount of spear 2 about spear connector 4 so as to allow the spear 2 to axially pivot about a fixed axis. Since the front ends of conventional farm tractors are not usually equipped with suitable connective sites for axially mounting spear 2 thereto, the front mounted attachment 1A is modified to include a supportive frame (generally designated as 15) so as to permit spear 2, the hydraulic cylinder C stabilizing braces 8A and 8B to be axially mounted thereto. This permits the spear 2, stabilizing braces 8A and 8B of an appropriate length and carriage 6 (as depicted by the Figures) to be interchangeably used for both the rear mounted attachment 1A and front mounted attachment 1B.

With particular reference to FIG. 4, the frame 15 is depicted as a rectangular-shaped frame portion (generally designated as 16) constructed of angle iron or other material of suitable strength. Frame portion 16 is depicted as including a top 16a, bottom 16b, and two side (16c and 16d) sections welded together at their respective cornering edges to form a rectangular shaped frame portion 16. A pair of vertically extending cross bars 17 and 18 are laterally spaced sufficiently apart along the vertical bisect of top section 16a and bottom section 16b to permit spear 2 to be pivotally mounted thereto and radially move therebetween. Cross bars 17 and 18 also serve to structurally reinforce frame portion 16 and as an anchoring mount structure for axially connecting hydraulic cylinder C thereto. Cross bars 17 and 18 are provided with a plurality of laterally corresponding shaft apertures 4 which in conjunction with securing pin 4B serve as adjustable connecting sites for coupling the spear connector 4 thereto. The adjustable connecting sites 4b allow for the pivotal mount of spear 2 to be appropriately adjusted to suit the tractor type (e.g. wheel height, etc.) for operational and field conditions. Alternatively, an axial connecting site for spear connector 4 may be provided by a pair of rearwardly or forwardly extending mounting wings (not shown) suitably equipped with shaft receiving apertures (not shown). A pair of cylinder mounting legs and (each respectively fitted with mating hydraulic cylinder axial connectors 22a and 22b) extend perpendicularly forwardly from the lowermost portion of cross bars 17 and 18 for axially mounting site for mounting the hydraulic cylinder C to frame 15.

Frame 15 is also equipped with a wide wheel frame mounting section (prefixed by 23) the lower portion of which is of a triangular-shape so as to matingly rest flushly against the top rail and front rail of the front axle beam of a wide wheeled tractor A. Diagonal bars 23a and 23b secured (e.g. welded, bolted, etc.) onto the opposing cornering edges of top section 16a and extending rearwardly and diagonally downwardly therefrom to a terminating edge disposed beneath bottom section 16b. Rearward projecting support bars 23c and 23d respectively extend perpendicularly rearward from the opposite cornering edges of bottom section 16b. Bars and 23c an 23d extend beyond their intercepting juncture onto diagonal bars 23a and 23b and respectively form a pair of angle plates which ride upon the top and front rail sides of the wheel beam. Diagonal bars 23a and 23b are each fitted with a first 23e and second 23f brace connecting sites for the axially mounting of stabilizing braces 8A and 8B thereto.

As may be observed from Figures depicting front attachment 1B, braces 8A and 8B are shown as being bolted onto diagonal bars 23a and 23b with an internally disposed unthreaded portion of bolt 23g thereby serving as a shaft for the axially mounting braces 8A and 8B thereto. If desired, braces 8A and 8B or diagonal bars 23a and 23b may include shaft appendages (not shown) such as pin, bolt, etc. to serve as the connective site.

The front mounted attachment 1A departs from conventional bale carriers since it rides upon the axle support beam of a wide wheeled tractor. It may be observed from the front mount attachment 1A views that diagonal bars 23a and 23b both extend below and beyond their respective intersects onto rearward projecting support bars 23c and 23d with this portion of bars 23a and 23b both including a diagonally cut s that the diagonal bars 23a and 23b in respective association to the lower interface of bars 23c and 23d thereby become aligned (at right angles) to their abutting juncture onto the wheel axle support beam of the transporting tractor A. The portions of diagonal bars 23a and 23b which abuttingly interface onto the front rail of the axle support beam function as a stop so as to prevent backward movement of frame 15 when an opposing force (e.g. such as arises during spearing or the transporting of a bale therewith) is applied against mounted attachment 1B. Vertical dislodgement of frame 15 is prevented by the attachment 1A and bale B weights which bias bars 23c and 23d firmly against the top rail interface of the beam. This particular combination of frame 15 equipped with a frame mounting section 23 which nestles onto and rides upon the wheel axle support frame or beam may also be adopted for the mounting other attachments (e.g. excavating and snow removal attachments, etc.) to wide wheeled transporting tractors A.

The weight of the front end mounted attachment 1A will fulcrum about the wheel axle beam. A pair of guy chains 24 and 25 respectively secured about the rear axle of the transporting tractor A serve as anchoring guys maintaining frame 15 in the appropriate upright position. Frame 15 is depicted (as may be observed fully or partially from FIGS. 1 and 4-8) as including a pair of guy chain linking bars 26 and 27 which are axially mounted onto the uppermost margin of side sections 16c and 16d. The guy chains linking bars 26 and 27 extend rearwardly from frame 15 and are fitted with chain connectors 28 and 29 for connecting chains 24 and 25 thereto. Other means for anchoring frame 15 and protecting it from forward dislodgement from the transporting tractor A may also be utilized for this purpose provided such anchoring means possess sufficient structural strength to retain the frame 15 in an upright position while also providing a comparable degree of flexibility as afforded by the aforementioned guy chain (24 and 25) and guy bar (26 and 27) combination.

Unlike conventional bale carrying spears which are most typically of a solid or circular rod shaped form, the barrel 5 of spear 2 herein is provided in the preferred embodiments of this invention in the form of a polygonal tubular barrel 5 of sufficient structural strength (e.g. steel) to serve as a barrel 5 for spearing and the transport of large bales therewith. The tubular polygonal shaped barrel 5 imparts a higher degree of structural strength to barrel 5 while also minimizing spear weight and affording a suitable barrel contour for slideably engaging onto barrel guide 14. Although tubular polygonal barrels of various shapes (e.g. triangular, rectangular, pentagonal, hexagonal, heptagonal, octagonal, etc.) may be utilized for this purpose, rectangular shaped barrels (preferably of a square and hollow construction) are particularly well suited for use in constructing the barrel 5 of spear 2 herein.

FIGS. 1-8 depict a preferred embodiment of the spear 2 and carriage guide 14 combination. As may be observed, particularly in FIG. 4, barrel 5 is depicted as being of a square rectangular tubular construction in which the lowermost and uppermost tubular corner portions of barrel 5 matingly corner onto the corresponding interfaces thereto of cradle guide 14. By placing the barrel 5 in this cornering position within cradle guide 14, two of the cornering edges of the barrel 5 rest in vertical alignment to one another within cradle guide 14. Since the strongest structural strength of the rectangular barrel 5 exists diagonally across its cornering edges, the placement of barrel 5 within guide 14 so that at least two of its cornering edges are in substantial vertical alignment with one another, the strength of spear 2 during the bale lifting and transport is significantly increased. This permits a lighter weight tubular barrel 5 to be utilized in spear 2 without sacrificing upon its overall structural strength.

As may also be further observed, the two remaining cornering edges of barrel 5 are likewise nestled within mating cornering edges of guide 14 leaving the flat surface of both the barrel 5 and guide 14 to slideably interface therebetween. Although the barrel 5 may simply rest upon carriage 6 without any guides therefore, it is advantageous for carriage 6 to include guide 14. Carriage 6 will advantageously include at least a grooved guide or channel (not shown) with a mating enclosed guide 14 as illustrated in FIGS. 1-8 being most preferred. The guide 14 also contributes to enhance the structural strength to barrel 5 by providing an intermediate supportive structure while also enhancing its lateral and vertical stability.

The preferred embodiments of pivotal spear connector 4 may be observed in greater detail by referring particularly to FIGS. 4 and 8. The spear connector 4 is shown as including a welded steel insert 4A diagonally aligned across the barrel cavity so as to rest in vertical alignment to the uppermost and lowermost corners of barrel 5 which helps to maintain the spear 2 at fixed and proper orientation when coupled to its pivotal mount.

FIG. 9 depicts an alternative cradle design in which the cradle 14 is adapted to guide barrel 5 with the flat barrel portions of barrel 5 resting flatly and slideably engaging onto a corresponding flat guide surface as opposed to cornering edge engagement shown in the other Figures. The FIG. 9 cradle 14 includes a slotted portion 14a through which a reinforcing rib 5a of spear 2 slides. The top slotted portion 14a and rib 5a serve to guide and maintain proper orientation of spear 2.

In the preferred embodiments of the invention, tine 3 is also preferably of polygonal configuration. Tine 3 is preferably of a geometric pyramidal configuration having a base which mates onto the barrel tapered to a tip to form a bale impaling tip. The tine 3 may be a hollow core directly fabricated from the tubular barrel stock by cutting a portion of tubular stock therefrom so the tubular stock end may then be shaped and welded together in a pyramid-shaped configuration as illustrated in the Figures.

The bale carrying attachments 1 herein provides an effective attachment which may be adapted for use upon transporting tractors generally equipped with a hydraulic power source. In operation, the attached attachment 1 is simply adjusted via hydraulic cylinder C to the appropriate spearing position (e.g. see FIGS. 2, 3 and 6) for the front and rear mounted attachments 1, the bales are speared by driving the transporting tractor onto and impaling the bale and then lifting the bale B to the transporting position. The attachment 1 also provides exceptional fixed stability to spear 2 during the spearing and bale transporting operation. Since both the front 1A and rear mounted attachments 1B may be placed in close proximity as to the transporting tractor A as depicted in the Figures, the bale weight is operatively positioned for optimum stability during transport. The front mounted attachment 1A is also designed so to further optimize the bale carrying stability of the transporting tractor. The front end attachment 1A allows for a more complete vertical lift of bale B so as to assure its speared positioning as close to the carrier as possible to insure optimum transport safety and effectiveness. The transported bales are accordingly effectively carried as close to the tractor's center of gravity as possible. These features when combined with the lateral stability afforded by the present attachments 1 significantly enhance the overall stability and safety thereof.

What is claimed is:

1. A bale carrying attachment for use in combination with a transporting tractor to transport a bale therewith, said attachment comprising:
   (A) a bale impaling spear which includes a pivotal spear connector at one spear end for mounting the spear to a pivotal mounting site so as to permit the spear to radially pivot about said pivotal connector, a tine at an opposite spear end for impaling the bale therewith, and an elongated spear barrel bridging between said tine and said pivotal connector;
   (B) a carriage member which slideably reciprocates along said barrel and serves to raise and lower said spear as the carriage member reciprocates along said barrel;
   (C) axial mounting means for connecting the carriage member to a power drive source so as to permit the drive source to axially pivot about said axial mounting means; and
   (D) stabilizing means axially mounted onto said carriage member for stabilizing said carriage member against lateral movement as the carriage member reciprocates along said barrel.

2. The attachment according to claim 1 wherein the stabilizing means comprises a first lateral support brace and a second lateral support brace with said first brace and said second brace being respectively fitted with a first axial connector for axially mounting said first brace and said second brace onto the carriage member and a second brace connector for pivotally mounting said first brace and said second brace onto fixed mounting sites laterally spaced sufficiently apart so as to stabilize the carriage member against lateral movement.

3. The attachment according to claim 1 wherein the barrel comprises a barrel of a polygonal configuration.

4. The attachment according to claim 3 wherein the carriage member includes a cradled portion of a contoured configuration for slideably mating onto said polygonal configuration of said barrel.

5. The attachment according to claim 4 wherein the cradled portion includes a recessed region for slideably engaging onto said barrel.

6. The attachment according to claim 5 wherein the cradled portion comprises a sleeved portion enveloping said barrel and the pivotal spear connector aligns said barrel so as to interfacially engage the carriage member within said recessed region.

7. The attachment according to claim 1 wherein the carriage member includes at least one shaft receiving aperture for axially connecting the axial mounting means and the stabilizing means to the carriage member.

8. The attachment according to claim 7 wherein the stabilizing means includes a first lateral support brace and a second lateral support brace respectively fitted with a carriage member connector at one brace end for the axially connecting of said first and said second lateral support brace to aperture and a second terminal connector for axially mounting an opposite brace end of said first brace and said second brace respectively onto a first lateral axle mounting site and an oppositely positioned second lateral axle mounting site.

9. The attachment according to claim 8 wherein the attachment includes a support frame having a wheel axle support beam engaging unit for placement of the frame onto a wheel axle support beam of a wide wheeled front axled tractor, a rearward movement stop for stopping the rearward movement of said frame upon said support beam, the pivotal mounting site for connecting the pivotal spear connector to the frame, the first lateral axle mounting site and the second lateral axle mounting site laterally positioned sufficiently apart upon said frame so as to stabilize the carriage member against lateral movement and a power drive axle connector mounted upon said frame at a position in substantial vertical alignment to said pivotal mounting site for axially coupling the power drive source onto said frame, and anchoring means for anchoring the frame onto a rear axle of the tractor.

10. A bale moving attachment adapted for transporting a bale when mounted onto and attached to a transporting tractor, said attachment comprising a bale impaling spear which includes an elongated barrel terminated at one barrel end by a pivotal barrel connector so as to permit radially movement of said barrel about said barrel connector, two laterally extending braces respectively equipped with axial brace connectors at opposite brace ends so as to allow for radial movement of said braces about said axle brace connectors while also concurrently stabilizing said braces against lateral displacement, and a carriage member which slideably engages said barrel and serves as an adjustable weight bearing carrier for said spear, with said carriage member further including an axial drive connector for axially connecting a drive unit onto the carriage member so as to thereby afford a drive means for adjusting the carriage member to an appropriate elevational pitch when said carriage member is connected to said drive means, and an axial mount for axially mounting the braces onto said carriage member.

11. The attachment according to claim 10 wherein the attachment includes a support frame having a front axle support beam engaging unit for placing the frame onto a front axle support beam of the tractor.

12. The attachment according to claim 11 wherein the frame includes a first lateral axle mounting site and a second lateral axle mounting site laterally positioned sufficiently apart upon said frame so as to stabilize the carriage member against lateral displacement when said axial brace connectors are axially connected to said first lateral axle mounting site, said second lateral axle mounting site and said carriage member.

13. The attachment according to claim 10 wherein said barrel and said carriage are positionally aligned within said attachment so as to form a bisecting vertical plane of a longitudinal axis of said tractor when said attachment is operationally attached onto said tractor.

14. The attachment according to claim 10 wherein said laterally extending braces are axially mounted onto the carriage member at a common carriage mounting site and said braces laterally extend outwardly therefrom.

15. A front-end mountable bale moving attachment adapted for transporting a bale when mounted onto a transporting tractor, said attachment comprising a bale impaling spear which includes an elongated barrel terminated at one barrel end by a pivotal barrel connector so as to permit radial movement of said barrel about said barrel connector, two lateral braces respectively equipped with axle brace connectors at opposite brace ends so as to allow for radial movement of said braces about said axle brace connectors, a carriage member which slideably engages said barrel and serves as an adjustable weight bearing carrier for said spear, with said carriage member further including an axial drive connector for axially connecting a drive unit onto the carriage member so as to thereby afford a drive means for adjusting the carriage member to an appropriate elevational pitch when said carriage member is connected to said drive means, an axial mount for axially mounting the braces onto said carriage member, and a front support frame having a wheel axle support beam engaging unit for placement of the frame onto a front wheel axle support beam of a wide wheeled front axled tractor, a rearward movement stop for stopping the rearward movement of said frame upon said support beam, a pivotal spear mounting site for connecting the pivotal spear connector to the frame, a first lateral axle mounting site and a second lateral axle mounting site laterally positioned sufficiently apart upon said frame so as to stabilize the carriage member against lateral movement when said axial brace connectors are axially connected to said first lateral axle mounting site, said second lateral axial mounting site and said carriage member, and a power drive axle connector mounted upon said frame at a position in substantial vertical alignment to said pivotal spear mounting site for axially coupling the drive means onto said frame.

* * * * *